INVENTOR.
KALMAN ROCZEY-KOLLER

United States Patent Office 3,430,332
Patented Mar. 4, 1969

3,430,332
PRODUCTION LINE SOLDERING WITH APPLICATION OF ULTRASONIC ENERGY DIRECTING TO MOLTEN SOLDER
Kalman Roczey-Koller, Brossard, Quebec, Canada, assignor to Electrovert Manufacturing Co. Ltd., Montreal, Quebec, Canada
Filed Apr. 1, 1966, Ser. No. 539,367
U.S. Cl. 29—471.1          10 Claims
Int. Cl. B23k 31/02

ABSTRACT OF THE DISCLOSURE

A method and apparatus for soldering or tinning workpieces by passing the workpieces through a standing wave of molten solder includes the application of ultrasonic energy directly to the standing wave. A static pressure is applied to a body of molten solder to cause the molten solder to flow upwardly through an upright nozzle which has an orifice elongated transversely of the direction of movement of the workpieces, with the solder overflowing the edges of the nozzle to form a standing wave with return of the solder to the body of solder. An ultrasonic transmitter or "horn" is disposed within the standing wave and immersed therein, and is energized through a transmission member extending through a wall of the solder container and connected at one end to a source of ultrasonic energy and at the other end to the ultrasonic transmitter or horn.

Background of the invention

This invention relates to the soldering and tinning and, more particularly, to a production line soldering or tinning of work pieces in which the work pieces are moved in contact with flowing molten solder and in which the flowing molten solder is vibrated by the directed application thereto of ultrasonic energy.

In the production line soldering of work pieces, for example, printed circuit boards, the surfaces to be soldered must first be pre-cleaned, after which they have flux applied thereto. The pre-cleaned and fluxed surfaces, and usually a good portion of the work piece, are then preheated after which the surfaces to be soldered are passed through molten flowing solder. The molten flowing solder may be used either for the purpose of pre-tinning circuit connections, such as those on printed circuit boards, or for the purpose of soldering joints between the printed circuitry and other elements on printed circuit boards having electronic components mounted thereon. After the soldering or pre-tinning step has been completed, the tinned or soldered surfaces must be washed. Such a production line operation differs substantially from a batch process in which, for example, the work to be treated is dipped into a pot of molten solder for the purpose of tinning or soldering.

Due to the foregoing requirements, a production line for soldering work pieces, such as printed circuit boards, for example, is rather long and includes several fairly expensive pieces of apparatus, as well as requiring several different and distinct operations. Thus, considerable installation space is required as is also additional supervising attention for the various operations in addition to the tinning or soldering operation. It will be apparent, from the foregoing, that a considerable reduction in the overall expense of tinning or soldering operations would be possible if the number of separate steps or treatments involved could be reduced, as by consolidation of some of the steps.

As inferred above, there are two commonly used techniques for soldering or tinning various articles, and particularly for soldering or tinning printed circuit boards. In one technique, the soldering is effected by dipping the cleaned and fluxed printed circuit board into a pot or container containing molten solder. While this effects adequate soldering, including adequate surface contact of the solder with the parts to be soldered, it has the disadvantage that it is not particularly adaptable to a production line operation, at least not without complications and increased expense.

Another technique is commonly used in modern day soldering, and this is known as the "wave soldering" technique. In the wave soldering technique, molten solder is continually forced to flow upwardly through a relatively narrow nozzle which is elongated transversely of the direction of movement of work pieces. The upwardly flowing solder overflows the nozzle at the discharge end thereof to form a standing wave of molten solder which has a height appreciably above the upper edge of the nozzle through which the solder flows.

In this technique, the work to be soldered, such as the mentioned printed circuit boards, may be passed in contact with the standing wave of molten solder. Particular attention must be paid with respect to movement of the work through the solder wave, relative position of the work moving through the solder wave, and other factors, in order to obtain adequate surface contact of the solder with the printed circuits and other components and leads to be soldered or tinned. Nevertheless, the wave soldering technique has been widely adopted for production line soldering of printed circuit boards as well as for production line soldering of other work pieces.

In accordance with the invention, it has been discovered that the application of ultrasonic energy directly to a flowing stream of molten solder in the zone or area immediately adjacent contact thereof by work to be soldered, and without the interposition of any container wall or the like between the source of ultrasonic energy and the molten solder, enables the elimination of the separate pre-cleaning, fluxing, preheating and washing operations during a production line soldering operation. Furthermore, such application of ultrasonic energy directly to a flowing stream of molten solder, such as a standing wave of molten solder, results in a tremendous increase in the surface area of the flowing molten solder or standing molten solder wave, whereby the wetting properties of the solder and its cleaning action are very substantially increased.

Accordingly, it is an object of the present invention to provide a method of soldering in which the parts to be soldered are brought into contact with a flowing stream of molten solder and in which ultrasonic vibrations are generated directly within the flowing stream of molten solder.

Another object of the invention is to provide soldering apparatus of the flowing stream type and including means for generating ultrasonic vibrations directly in the flowing stream of molten solder.

A further object of the invention is to provide wave soldering apparatus including an ultrasonic transmitter immersed directly in the solder forming the wave, and means for ultrasonically vibrating the transmitter.

Yet another object of the invention is to provide a method of soldering in which the work to be soldered is passed in contact with a flowing stream of molten solder and in which pre-cleaning, fluxing, preheating, soldering and washing of the work are effected in a single step.

A further object of the invention is to provide wave soldering apparatus including means for generating ultrasonic vibrating directly in the soldering wave, and in which the pre-cleaning, fluxing, pre-heating, soldering and washing of the work is effected at a single location.

Still another object of the invention is to provide a method of wave soldering in which the standing wave of molten solder is ultrasonically energized.

A further object of the invention is to provide wave soldering apparatus including means for ultrasonically energizing the standing wave of molten solder.

For an understanding of the principles of the present invention, reference is made to the following description of typical embodiments thereof as illustrated in the accompanying drawings.

Figure 1:
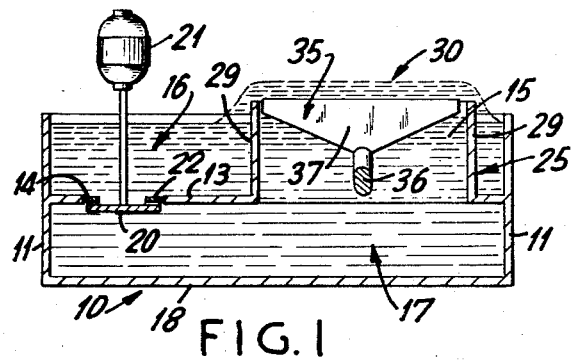
FIG. 1 is a vertical longitudinal sectional view, on the line 1—1 of FIG. 2, of one form of apparatus embodying the invention.

In the drawings, and solely for purposes of illustration and not in any limiting sense, the invention is illustrated as embodied in a known type of wave soldering apparatus such as shown for example, in U.S. Patent No. 3,198,414, issued Aug. 3, 1965, to Louis V. Tardoskegyi. However, it should be understood that the invention is not limited to the illustrated type of wave soldering apparatus but may be applied equally to any known type of wave soldering apparatus or of other soldering apparatus in which the work to be soldered is brought into contact with a flowing stream of molten solder. Before discussing the various embodiments of the invention in detail therefore, a general description of wave soldering apparatus will be given.

Referring to the drawings, a tank 10 containing molten solder 15 is illustrated as having opposite end walls 11, 11, opposite side walls 12, 12 and a bottom wall 18. A substantially horizontal partition 13 interconnects the end and side walls about midway of the height of tank 10, and partition 13 is formed with an opening of port 14 therethrough. This partition divides tank 10 into two sections, one of which is a return section 16, for overflowing molten solder, and the other of which is a supply section 17.

Molten solder from return section 16 is supplied, under a static pressure, to supply section 17 by means of a turbine pump having a rotor 20 disposed at port 14 and driven by a motor 21. Rotor 20, in the illustrated example, is formed with vanes 22 so that, upon rotation of rotor 20 by motor 21, the molten or liquid solder is discharged peripherally under pressure from rotor 20. This rotor is disposed in operative relation substantially in or immediately below port 14. The molten or liquid solder under static pressure in supply section 17 is forced upwardly through a nozzle 25 extending upwardly from partition 13.

Nozzle 25 is relatively long and narrow in the longitudinal direction of tank 11, and has side walls 26 extending upwardly from the nozzle entry 27 in partition 13 and then converging inwardly toward each other to form a relatively elongated and relatively narrow, and preferably substantially rectangular, discharge slot 28. End walls 29 interconnect side walls 26'. The extreme upper edges of walls 26 are formed with oppositely extending, substantially horizontal and coplanar flanges 23 extending therealong. The upper end of nozzle 25 extends somewhat above the upper edges of the walls of tank 11 and, in the particular known type of wave solder apparatus shown in the drawings, nozzle 25 may extend above the upper edge of tank 11 by an amount of the order of 0.5 inch.

In the described wave soldering apparatus, molten solder under static pressure in supply section 17 is forced upwardly through nozzle 25 and issues from discharge slot 28 to form a continuously replenished and continuously reconstituted standing wave 30 of molten solder which overflow into return section 16 of tank 10. Standing wave 30 has a controllable and readily adjustable height above the upper end of nozzle 25, so that printed circuit boards and other work pieces may be passed thereover for soldering of connections and without interfering with any of the structural parts of tank 10 or nozzle 25. The height of wave 30 can be adjusted readily by adjusting the proper speed for motor 21 and thus the static pressure existing in supply section 17 of tank 10.

In accordance with invention, the flowing molten solder, and more particularly, the molten solder flowing upwardly through nozzle 25 and constituting the standing wave 30, is directly energized by ultrasonic energy. By the term "directly energized," or its equivalent, as used hereinafter, is meant an energization in which the ultrasonic vibrations are developed direclty within the body of molten solder rather than being transmitted to the body of molten solder through the wall of a tank, the wall of a nozzle, or the like. For this purpose, an ultrasonic energy transmitter is disposed directly in the solder flowing upwardly through nozzle 25 and immediately adjacent the upper end of nozzle 25, so that the standing wave 30 itself has ultrasonic energy generated directly therein. Various arrangements may be used for directly generating ultrasonic energy in the molten solder, as exemplified by the three different exemplary embodiments of the invention illustrated in the drawings.

Figure 3:
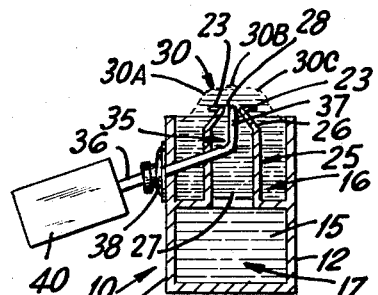
FIG. 3 is a transverse sectional view, on the line 3—3 of FIG. 2, of the apparatus.
Figure 2:
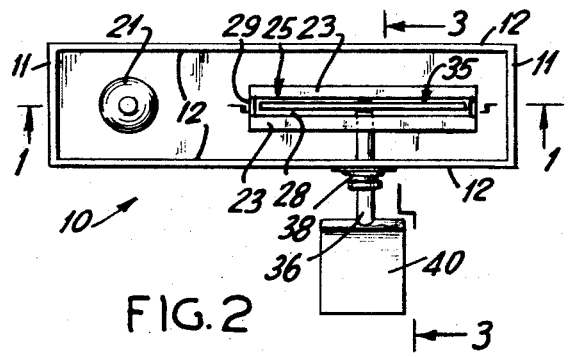
FIG. 2 is a plan view of the apparatus shown in FIG. 1.

Referring first to the embodiment of the invention shown in FIGS. 1, 2 and 3, in this embodiment, the ultrasonic transmitter or probe extends into the solder flowing upwardly through nozzle 25 and the wave 30 from a side wall 12 of tank 10. The transmitter or probe 35 comprises an elongated rod portion 36 extending upwardly and inwardly through a side wall 12 of the container and a side wall 26 of nozzle 25, and a relatviely large area portion 37 on the inner upper end of rod portion 36 and extending substantially parallel to the longer side wall 26 of nozzle 25, and is illustrated as a substantially triangular component having truncated corners and a central extension leading to rod portion 36. The triangular component 37 is inverted so that its base or longest edge is immediately adjacent the upper end edge of nozzle 25 and has a length just slightly shorter than the length of slot 28.

Figure 7:
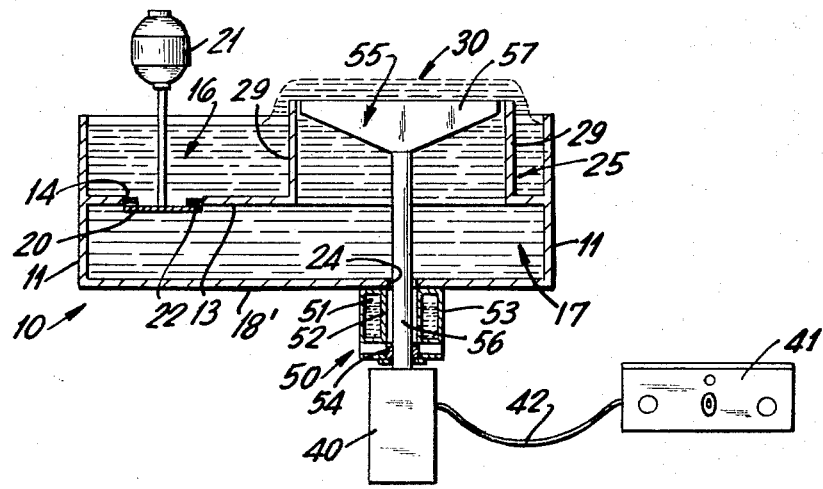
FIG. 7 is a longitudinal vertical sectional view, on the line 7—7 of FIG. 8, of still another form of apparatus embodying the invention, with a schematic illustration of certain parts.
Figure 8:
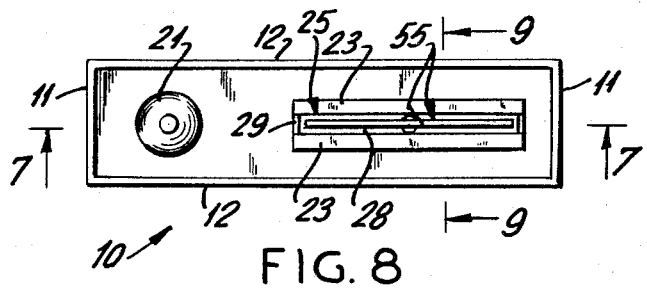
FIG. 8 is a plan view of the apparatus shown in FIG. 7.
Figure 9:
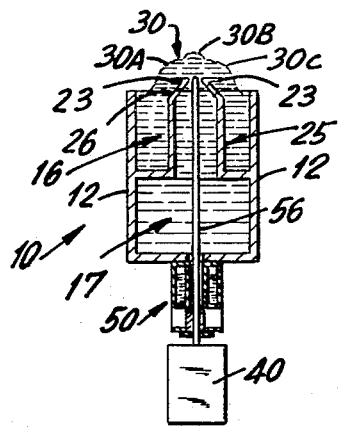
FIG. 9 is a transverse sectional view on the line 9—9 of FIG. 7.

Transmitter 35 is ultrasonically vibrated by a transducer 40, and the entire arrangement is mounted on a side wall 21 of tank 10 as by a mounting and gasket means generally indicated 38 and through which the rod portion 36 of transmitter 35 extends in sealed relation. The input of transducer 40 is connected to the output of an oscillator-generator 41, such as shown in FIGS. 7, 8 and 9. The oscillator-generator acts as a tuning unit driving transducer 40 which converts the electrical energy supplied thereto into a corresponding mechanical vibration energizing transmitter 35 disposed directly within the flowing molten solder.

Inasmuch as transmitter 35 is directly immersed in the flowing molten solder 15, and particularly the molten solder flowing upwardly through nozzle 25 and forming the wave 30, the solder wave 30 is energized directly by ultrasonic energy or vibrations rather than indirectly through vibration of the walls of the nozzle or of the walls of container 10. This direct ultrasonic energization of wave 30 increases its surface area by approximately 200 times, with a corresponding increase in the wetting properties of the molten solder wave 30.

As a result of the ultrasonic energization of the standing wave 30, the latter is divided into three sections, namely, a leading section 30A, a central section 30B which is higher than the leading section, and a trailing section 30C of about the same height as the leading section 30A. In effect, there are three waves. These three waves perform three different functions. Assuming that the work, such as a printed circuit board, is moved from the left to the right, as viewed in FIG. 3, in contact with standing wave 30, the work will just contact the portion 30A of the solder wave, and portion 30A acts to preheat the work. The work then passes through the somewhat higher wave 30B, and this portion of wave 30 performs a cleaning action on the preheated work surfaces to be soldered. Next, the work contacts the wave portion 30C, and this portion of wave 30 effect the actual soldering or tinning of the surfaces of the work pieces. It should be noted, however, that while the ultrasonic energy is substantially fully concentrated in the central portion of 30B of wave 30, the ultrasonic energy also radiates into the wave portions 30A and 30C. Consequently, in a single operation and at a single "station" there are performed the functions of preheating, cleaning and soldering of the work, which have hitherto been performed as three different operations at three different stations.

Additionally, with ultrasonic energization thereof, the wave 30 is broken up into several sets of waves. One of these sets of waves is a longitudinal or main wave which is in the direction of vibration of the transmitter 35. The second set of waves comprises shear waves, which are by-products of reflections of the main ultrasonic waves. There is a third set of waves known as "Rayleigh" waves which are small waves beneath the surface of the wave 30 and are products of the reflection of the longitudinal wave. The fourth set of waves are the "Lamb" waves which are small ripples on the surface of the solder wave. The shear waves having a magnitude of about 50 percent of the magnitude of the longitudinal or main waves, and the "Rayleigh" waves have the magnitude of about 80 percent of the magnitude of the shear waves. The "Lamb" waves have a magnitude much smaller than the magnitude of the "Rayleigh" waves the magnitude of the "Lamb" waves being about 0.01 of the magnitude of the "Rayleigh" waves. All four sets of waves due to the ultrasonic vibration are superposed on each other and, having different wave lengths, they do not cancel or nullify each other. The aforementioned complex series of waves arises largely as the solder hits the work piece, such as a printed circuit board. However, it should be noted that only the shear wave of the series of complex waves is in actual contact with the work piece such as a printed circuit board.

The gasket of mounting device 38 must be designed to prevent leakage of molten solder from the container 10 and, for this purpose, various types of gaskets may be used such as graphite, metal, asbestos, etc.

The same type of seals as used in steam boilers may be used to prevent such leakage, as well as an additioinal type of seal to be described hereinafter with respect to the embodiment of the invention shown in FIGS. 7, 8 and 9.

Figure 6:
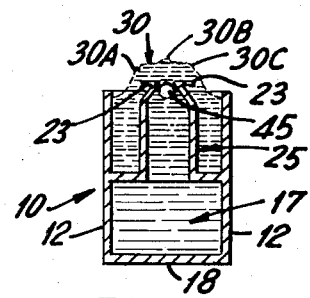
FIG. 6 is a transverse sectional view, on the line 6—6 of FIG. 5.
Figure 4:
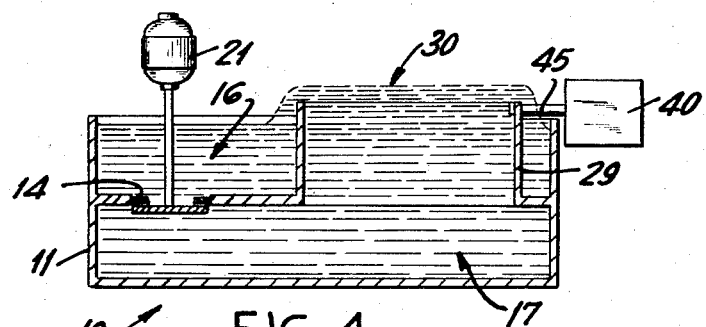
FIG. 4 is a longitudinal vertical sectional view, on the line 4—4 of FIG. 5, of another form of apparatus embodying the invention.
Figure 5:
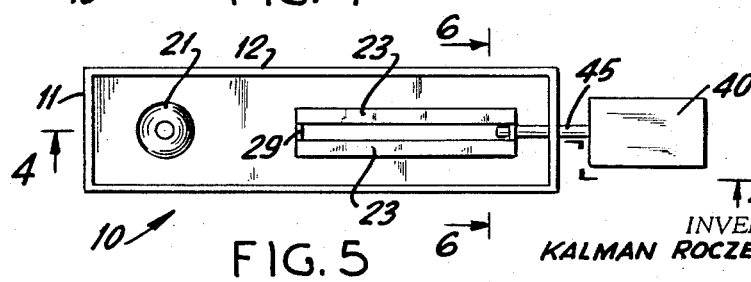
FIG. 5 is a plan view of the apparatus shown in FIG. 4.

Referring to FIGS. 4, 5 and 6, the embodiment of the invention shown therein, insofar as the actual wave soldering apparatus is concerned, is identical with that shown in FIGS. 1, 2 and 3 and the same reference characters have accordingly been applied to corresponding parts of FIGS. 4, 5, and 6. The difference between the embodiment of FIGS. 4, 5 and 6 and the embodiment of FIGS. 1, 2 and 3 is that, in the embodiment of FIGS. 4, 5 and 6, the ultrasonic transmitter or probe is introduced into the solder flowing upwardly through nozzle 25 through an end wall 29 of nozzle 25 rather than through a side wall of the container and a side wall of the nozzle.

Referring of FIGS. 4, 5 and 6, the transmitter or probe 45, corresponding to the transmitter or probe 35 of FIGS. 1, 2 and 3, is a cylindrical rod having ultrasonic vibrations imparted thereto by the transducer 40 which converts electrical energy into mechanical vibrations. Transducer 40 is suitably mounted and in a fixed position adjacent an end wall 11 of container 10, and at a height such that probe or transmitter 45 extends above, or substantially above, the end wall 11 and through an end wall 29 of nozzle 25 so as to project into the solder flowing upwardly through nozzle 25. If necessary, the transmitter 45 may extend through an aperture or notch adjacent the upper end of the end wall 11 of container 10, in suitably sealed relation to prevent leakage of solder from container 10. Otherwise, the arrangement operates in the same manner as described in FIGS. 1, 2 and 3, portions 30A, 30B and 30C as best seen in FIG. 6.

In the embodiment of the invention shown in FIGS. 7, 8 and 9, the wave solder apparatus, per se, without the ultrasonic vibrating means, is essentially the same as the wave soldering apparatus shown in FIGS. 1 through 6, except for a modification of the lower wall of container 10. Accordingly, the same parts have been indicated with the same reference characters, except that the lower wall 18 of FIGS. 1 through 6 is designated 18' in FIGS. 7, 8 and 9. In the arrangement of FIGS. 7, 8 and 9, the transmitter of ultrasonic energy extends upwardly through nozzle 25 through an aperture in lower wall 18'.

The transmitter 55 of FIGS. 7, 8 and 9 comprises a rod portion 56 which is directly connected to transducer 40 for imparting of ultrasonic vibrations thereto, and a large area portion 57 which is generally of the same configuration of the portion 37 of the transmitter 35 shown in FIG. 1. The arrangement shown in FIGS. 7, 8 and 9, has the advantage, as compared to the arrangements shown in FIGS. 1 through 6, of requiring a very greatly reduced energy input to produce the ultrasonic energization of the molten solder wave.

FIGS. 7, 8 and 9 also show a novel sealing arrangement for the probe 55 and entering into solder tank 10. Due to the ultrasonic vibrations of transmitter 55, some of which are transmitted to surrounding structures, there is quite frequently difficulty in maintaining an adequate mechanical seal at the zone where the transmitter enters into the solder tank. The seals frequently tend to loosen under the ultrasonic vibration.

In the arrangement of FIGS. 7, 8 and 9, a novel "cold seal" is provided. This cold seal is generally indicated at 50. It will be noted that opening 24 is somewhat larger in diameter than the diameter of cylindrical rod section 56 to transmitter 55, there thus being an annular space left between portion 56 of transmitter 55 and the inner periphery of opening 24. Immediately below opening 24, an annular hollow cooling chamber 51, having a radially inner wall 52 and a radially outer wall 53, is secured to bottom wall 18' of tank 10. A suitable coolant, such as water, for example, is continuously circulated through cooling chamber 51.

Any molten solder flowing through the space between the inner periphery of opening 24 and the surface of rod section 56 of transmitter 55 comes into contact with a relatively cold inner wall 52 of chamber 51 and is solidified. This solidified solder forms a soft seal against any leakage of the solder from around the junction between cold seal 50 and bottom wall 18' of molten solder tank 10. At the lower end of chamber 51, a suitable sealing gasket or bushing is provided in sealing relation with rod portion 56 and transmitter 55. The arrangement of the cold seal 50, in conjunction with the bushing 54, and by virtue of the "soft seal" provided by the liquefied solder, efficiently prevents leakage of molten solder from tank 10.

As previously stated, the oscillator-generator acts as a tuning unit supplying high frequency electrical energy to transducer 40. For this purpose, generator 41 is connected by a cable 42 to transducer 40 and, while this arrangement is shown in FIGS. 7, 8 and 9, it should be understood that exactly the same arrangement is used in the embodiments of FIGS. 1 through 6. The oscillator-generator 41 may be of any known type and may either use thermionic valves as components or may have solid state circuitry. Also, means may be provided for maintaining oscillator-generator 41 automatically tuned to a predetermined frequency.

The most common arrangement for converting electrical energy into mechanical energy involves the use of piezoelectric crystals as the converter elements. As is known to those skilled in the art, the application of an A.C. potential to such crystals will result in the crystals vibrating to provide a mechanical output. However, due to the relatively high temperatures involved with soldering apparatus using a flowing body of molten solder, such piezoelectric crystals are not suitable because of their temperature characteristics. Accordingly, in the present instance, the actual conversion elements in transducer 40 are ferro-electric crystals. It is known to those skilled in the art that ferro-electric materials, by the application of a 10,000 volt charge thereto while at a temperature of 2,000° and while they are in the malleable state, can be converted to act like piezoelectric crystals. There is a change in the shape of the molecules so that the latter becomes macromolecular. After such conversion, the ferro-electric material may be used as a "crystal" for converting an applied A.C. potential into a mechanical vibration. Such ferro-electric "crystals" will easily withstand the relatively high temperatures involved in the particular soldering arrangement to which the invention is applicable.

The material of transmitters 35, 45 and 55 must be able to withstand high temperatures. These transmitters may be made of brass, stainless steel or like material, at least in those portions of the transmitters immersed in the moving stream of molten solder. Stainless steel is particularly useful in that it withstands very well the high temperatures involved.

Transmitters of ultrasonic energy are known under various designations, and one of the most common designations is "concentrator horn." The shapes of these transmitters may be varied, as is known to those skilled in the art, and in the present instance, a catenoidal shape is most effective. However, conical, exponential, double cylindrical, and triangular shapes may be used to good effect. The main point is that the active part of the transmitter must be immersed directly within the flowing molten solder so that it drives the solder directly rather than through the walls of the apparatus.

Due to the ultrasonic vibration of the molten solder wave as the work pieces are passing therethrough, it frequently happens, particularly in the case of printed circuit boards, that the applied solder on the work piece, while providing a completely satisfactory joint, has a somewhat rough external appearance as compared to the smooth external appearance resulting when a printed circuit board, for example, is soldered or tinned by being passed through a standing wave of molten solder without ultrasonic vibration. The joints and the tinning or soldering are completely adequate despite the roughened appearance. However, if it is desired to remove such roughened appearance and provide a smooth surface to the solder, then the work, such as printed circuit boards, being subjected to passage through an ultrasonically energized standing wave of molten solder to form the solder joints, can be passed subsequently through a second standing wave of molten solder which is not ultrasonically energized. This second wave of molten solder, upon passage of the work piece therethrough, will provide a smooth neat appearing surface to the applied solder.

The second wave is arranged in a trailing direction, with respect to the movement of the work pieces through the solder wave 30, and may be provided either in the same apparatus or in a second wave soldering apparatus of identical design but omitting the ultrasonic energization means. The sole criterion to be observed is that the work piece, such as a printed circuit board, must have completely left the ultrasonically energized wave 30 before it passes over the second standing wave of molten solder.

In many wave soldering operations, it is customary to disperse oil or other additives so that it will provide surface protection for the molten solder. While this is not necessary in the present invention, in view of the cleaning action provided by the central section 30B of solder wave 30, such oil may be used if desirable.

While specific embodiments of the invention have been shown and described in detail to illustrate the application of the principles of the invention, it should be understood that the invention may be embodied otherwise without departing from such principles.

What is claimed is:

1. Apparatus for soldering or tinning workpieces comprising, in combination, a container of molten solder, a horizontal partition subdividing said container, below the surface of the molten solder therein, into a supply section and a return section, a nozzle extending upwardly from an opening in said partition to a point above the surface of the molten solder in the container, said nozzle having an upwardly opening discharge orifice which is elongated transversely of the direction of workpiece movement, and pump means supplying molten solder from said return section through said partition to said supply section to create a static pressure in said supply section forcing molten solder to flow upwardly through said nozzle and overflow in the discharge end thereof to form a continuously replenished standing wave of molten solder extending transversely of the direction of workpiece movement and which overflows into said return section; said pump means constituting the sole means effecting flow of molten solder upwardly through said nozzle to replenish said standing wave of molten solder; an ultrasonic energy transmitter having a first portion positioned in said nozzle at the discharge orifice thereof and extending longitudinally of the constantly replenished standing wave throughout substantially the entire length of said discharge orifice; and ultrasonic energy generating means positioned outside said container adjacent a wall of the latter; said ultrasonic energy transmitter including a second portion rigid with said first portion and extending from said first portion through the interior of said nozzle and through said wall of said container and connected to said ultrasonic energy generating means for ultrasonic vibration of said first portion of said ultrasonic energy transmitter; the workpieces being passed in contact with the ultrasonically energized standing wave of molten solder.

2. Apparatus for soldering and tinning work pieces, as claimed in claim 1, in which said transmitter extends into said nozzle in a direction transverse to the longer dimension of the nozzle discharge orifice.

3. Apparatus for soldering and tinning work pieces, as claimed in claim 2, in which said transmitter comprises a rod portion extending upwardly into said nozzle and a relatively wide and flat portion on the inner end of said rod portion and enlarged upwardly of said nozzle and in a direction parallel to the longer direction of the nozzle discharge slot.

4. Apparatus for soldering and tinning work pieces, as claimed in claim 1, in which said ultrasonic transmitter comprises a rod extending into said nozzle substantially parallel to said partition and in a direction parallel to the longer dimension of the nozzle discharge orifice, said transmitter being disposed immediately below the discharge orifice of said nozzle.

5. Apparatus for soldering and tinning work pieces, as claimed in claim 1, in which said transmitter extends upwardly through the bottom wall of said container and through said opening in said partition.

6. Apparatus for soldering and tinning work pieces, as claimed in claim 5, in which said transmitter comprises a rod portion extending through the bottom wall of said container and upwardly into said nozzle through said opening in said partition, and a large area portion on the upper end of said rod portion extending parallel to the direction of upward flow of molten solder through said nozzle and broadened in a vertical direction and having a horizontal dimension slightly less than the longer inner dimension of said nozzle discharge slot.

7. Apparatus for soldering and tinning work pieces, as claimed in claim 5, including a cold seal surrounding said transmitter externally of said container and sealing against loss of solder flowing through the opening in the bottom wall of said container.

8. Apparatus for soldering and tinning work pieces, as claimed in claim 7, in which said cold seal comprises a hollow annular chamber surrounding, with clearance, said transmitter externally of said container; the opening in the bottom wall of said container being sufficiently large to provide clearance with said transmitter; said chamber having a radially inner wall closely adjacent said transmitter; and means for circulating a coolant through said chamber whereby molten solder flowing through the opening of the bottom wall of said container will solidify on said cooled inner wall of said chamber to form a soft seal.

9. Apparatus for soldering and tinning workpieces, as claimed in claim 1, including a second nozzle identical to said first nozzle except for said ultrasonic transmitter and the means for vibrating the same, disposed downstream, with respect to the direction of workpiece movement, from said first nozzle and at a spacing from the latter sufficient for a workpiece to clear the standing wave formed at the discharge orifice thereof before entering the wave formed at the discharge orifice of said second nozzle.

10. In a method of soldering or tinning in which workpieces are moved in contact with a constantly replenished, elongated and constantly overflowing standing wave of molten solder formed by molten solder flowing upwardly through a nozzle and overflowing the discharge orifice of the nozzle: the improvement comprising disposing an ultrasonic energy transmitter in said wave of molten solder throughout substantially the entire length thereof and spaced from the walls of the nozzle; and transmitting ultrasonic energy to the transmitter to impart ultrasonic energy directly to said standing wave of molten solder.

References Cited
UNITED STATES PATENTS

| | | | |
|---|---|---|---|
| 3,266,136 | 8/1966 | Gutbier | 29—471.1 |
| 3,198,414 | 8/1965 | Tardoskegyi | 228—37 |
| 3,303,983 | 2/1967 | Patrick | 228—37 |
| 3,277,566 | 10/1966 | Christensen | 29—471.1 |

RICHARD H. EANES, *Primary Examiner.*

U.S. Cl. X.R.

228—37